Nov. 22, 1927.
R. H. SCHWARTZ
TIRE FLAP OR PROTECTOR
Filed Dec. 6, 1924
1,649,862
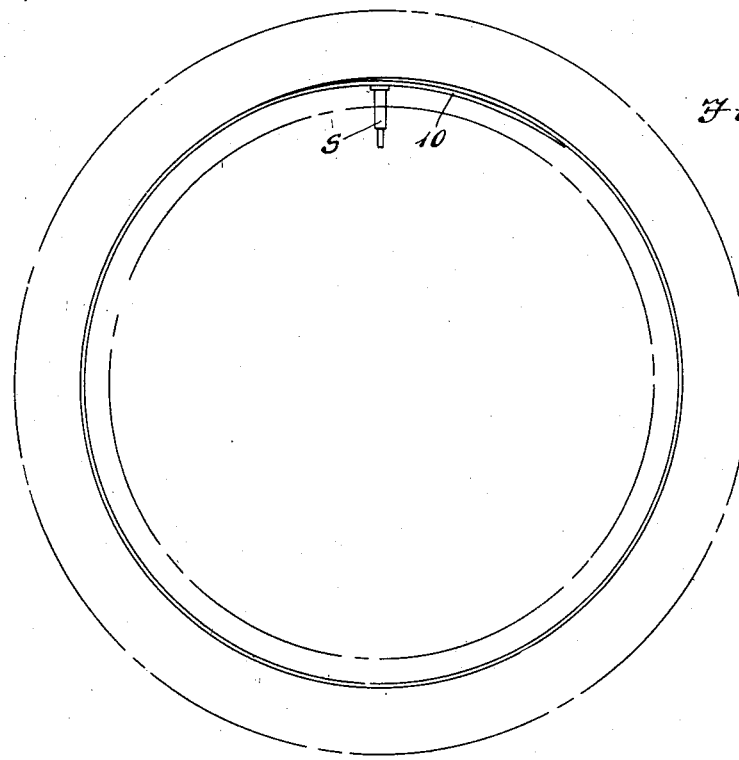
Fig.1.
Fig.2.
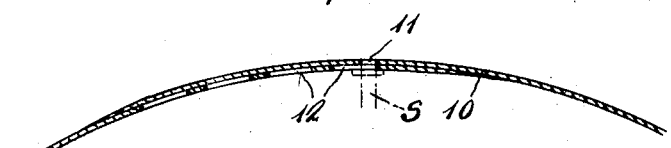
Fig.3.
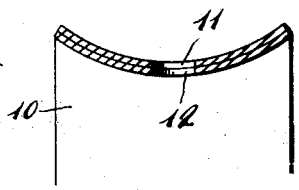
Fig.4.
INVENTOR
Roy H. Schwartz
BY John A. Bommhardt
ATTORNEY Patented Nov. 22, 1927.

1,649,862

UNITED STATES PATENT OFFICE.

ROY H. SCHWARTZ, OF CLEVELAND, OHIO.

TIRE FLAP OR PROTECTOR.

Application filed December 6, 1924. Serial No. 754,310.

This invention relates to improvements in tire flaps or protectors which are arranged upon the inner face of an inner tube to prevent pinching and to protect the same.

An important object is to provide a tire flap which is so constructed that a dealer need only carry in stock this particular type of protector in order to fill requests for flaps of different sizes.

In the automobile accessory stores at the present time about twenty different sized flaps are necessarily carried in stock in order to supply the demand of the purchaser, due to the fact that the ordinary tire flap is adaptable to only one standard sized tire. This condition obviously means a considerable investment in such stock and is undesirable.

In my improved flap the structure is such as to permit its use upon any of the standard sized tires and further to compensate for the usual shrinkage which will take place even after adjustment to a particular size.

Other objects are in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

Figure 1 is a side elevation of my improved tire flap;

Figure 2 is a detail sectional view of the over-lapping ends;

Figure 3 is a detail cross-sectional view of the over-lapping end portions; and

Figure 4 is a plan view of the over-lapping ends showing the feature whereby adjustment to all standard sized tires is obtained.

This tire flap or protector is made up of the usual or any preferred fabric and is preferably slightly concave in cross section to conform to the cross sectional shape of a tire.

In order to construct the flap 10 to permit use thereof with any standard sized tire I form near one end of said flap a valve stem opening 11 which is adapted for the reception of the usual inflating valve carried by a tire. The opposite end portion of the tire flap is provided with a series of longitudinally spaced slots 12 which extend parallel with the tire flap as clearly shown in the accompanying drawings. The ends of the slots are substantially semi-circular to allow for snug engagement with a valve stem and to strengthen the walls of the slots and to prevent tearing or ripping. Obviously any number of these slots may be employed and the shape and proportions may be varied as experiments may suggest.

In the application of this flap to a pneumatic tire I first insert the inflating valve stem S into one of the slots 12 after which I carry the other end or slotted portion of the flap around the tire and insert the valve stem into the opening 11. The distance between the opening 11 and the adjacent end of the tire flap is sufficient to allow the fabric to cover the slotted end of the flap and consequently eliminate the possibility of the slots injuring the inner tube. Means, (not shown) will be employed to indicate the size tire which will be accommodated through insertion of the stem into any one of the slots 12, thereby eliminating the necessity for any guess-work on the part of the user in the application of a flap constructed as herein described. With a construction as heretofore outlined it is quite apparent that I have provided a tire flap which may be readily applied to any standard sized tire and which will allow the dealer to cease carrying four or five different sized tire flaps.

Through the provision of a set of slots 11 shrinkage of a tire flap is cared for and since each slot is several times as long as the diameter of the valve stem the flap will automatically adapt itself to the particular size of tire.

I am aware of the grant of Reissue Patent Number 14,056, dated January 25, 1916. This patent while showing a single slot, does not anticipate the construction of a flap adaptable to all sized tires as well as having a construction to compensate for shrinkage. As pointed out a further and salient point is the elimination of the necessity for the dealer carrying a huge stock of different sized flaps.

Slight modifications in certain details of structure may be made and such of these changes as may fall within the scope of the appended claims, I consider within the spirit of my invention.

I claim:—

1. In a tire flap or protector, a strip of material having a valve stem opening spaced from one end, and a set of longitudinally spaced openings at the other end portion said set of slots terminating a less distance from the end than the distance between the valve stem opening and the adjacent end.

2. In a tire flap or protector, a strip of material slightly concavo-convex in cross section, said strip having a valve stem receiving opening near one end and a set of slots relatively circumferentially spaced at the other end, said set of slots extending over a less area than the distance between the valve stem opening and the adjacent end of the flap whereby to present a continuous smooth surface to an inner tube.

3. A tire flap for use in penumatic tire casings having varying commercial rim diameters, said flap including a body portion having a multiplicity of perforations adjacent one end thereof and a mating perforation adjacent the opposite end thereof, said multiple perforations when variously mated with said mating perforation being adapted to vary the effective length of the flap in accordance with various rim circumferences of differing sized tires, said mating perforation being disposed relatively to the nearest adjacent end of the flap more than the distance which is represented by the differences in circumference of the rims and bead portions of the different commercial sized tires in which the flap may be used.

In testimony whereof, I affix my signature.

ROY H. SCHWARTZ.